United States Patent [19]

King

[11] Patent Number: 5,742,502
[45] Date of Patent: Apr. 21, 1998

[54] METHOD AND APPARATUS FOR GENERATING SYNCHRONOUS DATA TRANSMISSIONS IN A DEVICE HAVING A UNIVERSAL ASYNCHRONOUS RECEIVER/TRANSMITTER

[75] Inventor: Gerald Robert King, Fort Lauderdale, Fla.

[73] Assignee: Motorola, Inc., Schaumburg, Ill.

[21] Appl. No.: 428,048

[22] Filed: Apr. 25, 1995

[51] Int. Cl.$^6$ .................................................. G05B 13/02
[52] U.S. Cl. ............................. 364/148; 375/369; 375/370
[58] Field of Search ............................. 364/148; 370/79, 370/91, 44; 395/250; 340/825.44; 375/188, 7, 3; 178/3

[56] References Cited

U.S. PATENT DOCUMENTS

| | | | |
|---|---|---|---|
| 4,325,147 | 4/1982 | Rothlauf | 370/91 |
| 4,353,128 | 10/1982 | Cummiskey | 370/44 |
| 4,454,383 | 6/1984 | Judd | 178/3 |
| 4,644,569 | 2/1987 | Brown et al. | 375/118 |
| 5,267,263 | 11/1993 | Feezel et al. | 375/7 |
| 5,287,458 | 2/1994 | Michael et al. | 395/250 |
| 5,309,154 | 5/1994 | Mun et al. | 340/825.44 |
| 5,371,736 | 12/1994 | Evan | 370/79 |

*Primary Examiner*—Reba I. Elmore
*Assistant Examiner*—Monica Lewis
*Attorney, Agent, or Firm*—Keith A. Chanroo

[57] ABSTRACT

A system (10) for transmitting a synchronous stream of data is set forth. The system (10) includes a universal asynchronous transmitter/receiver (30) includes a circuit for asynchronously transmitting a data character; a timing circuit for generating a signal (255, 260) upon completion of the asynchronous transmission of the data character; and an output line (140, 145) controllable to go to a data state independent of the data states of the bits of the data character. The system further includes a central processing circuit (15, 20, 25) that is responsive to the timing circuit of the UART (30). The central processing circuit (15, 20, 25) controls the output line (140, 145) of the UART (30) to go to a series of data states corresponding to individual bits of the synchronous data stream. The period of the individual bits corresponds to the signal generated by the timing circuit.

31 Claims, 4 Drawing Sheets

METHOD AND APPARATUS FOR GENERATING SYNCHRONOUS DATA TRANSMISSIONS IN A DEVICE HAVING A UNIVERSAL ASYNCHRONOUS RECEIVER/TRANSMITTER

FIELD OF THE INVENTION

The present invention relates to a data communication apparatus and method, and more particularly to an apparatus and method for generating synchronous data transmissions in a device having a universal asynchronous receiver/transmitter device.

BACKGROUND OF THE INVENTION

Known paging transmission systems encode message data into a binary bit stream. Such paging systems use synchronous data transmission protocols such as GSC, POCSAG, etc., each of which require complex bit manipulation of the message data.

Conventional personal computer systems are convenient to use, available to many users, and are capable of the complex bit manipulation needed to provide the encoding functions required for paging transmission protocols. The personal computer systems, however, are not generally provided with a means to synchronously transmit the encoded data. Instead, the computer systems are provided with a universal asynchronous receiver/transmitter circuit (UART) which is designed only for asynchronous data transmissions. Asynchronous data transmission cannot be used to transmit the standard synchronous protocols used by known paging systems. More particularly, the UART does not provide a means of sending data without framing bits as is required for synchronous communications. As a result, known personal computers, despite their advantages and availability, are unsuitable for use in transmitting synchronous data transmissions and, particularly, paging messages using existing synchronous protocols.

SUMMARY OF THE INVENTION

In accordance with the present invention, the disadvantages of using a standard, UART equipped personal computer for generating synchronous data transmissions have been overcome.

In accordance with one embodiment of the present invention, a system for transmitting a synchronous stream of data is set forth. The system includes a universal asynchronous transmitter/receiver having means for asynchronously transmitting a data character; a timing circuit for generating a signal upon completion of the asynchronous transmission of the data character; and an output line controllable to go to a data state independent of the data states of the bits of the data character. The system further includes a central processing circuit that is responsive to the timing circuit of the UART. The central processing circuit controls the output line of the UART to go to a series of data states corresponding to individual bits of the synchronous data stream. The transmission period of the individual bits is dependent on the signal generated by the timing circuit.

Other advantages and novel features of the present invention, as well as details of an illustrated embodiment thereof, will be more fully understood from the following description and drawings.

DESCRIPTION OF THE PREFERRED EMBODIMENT

Figure 1:
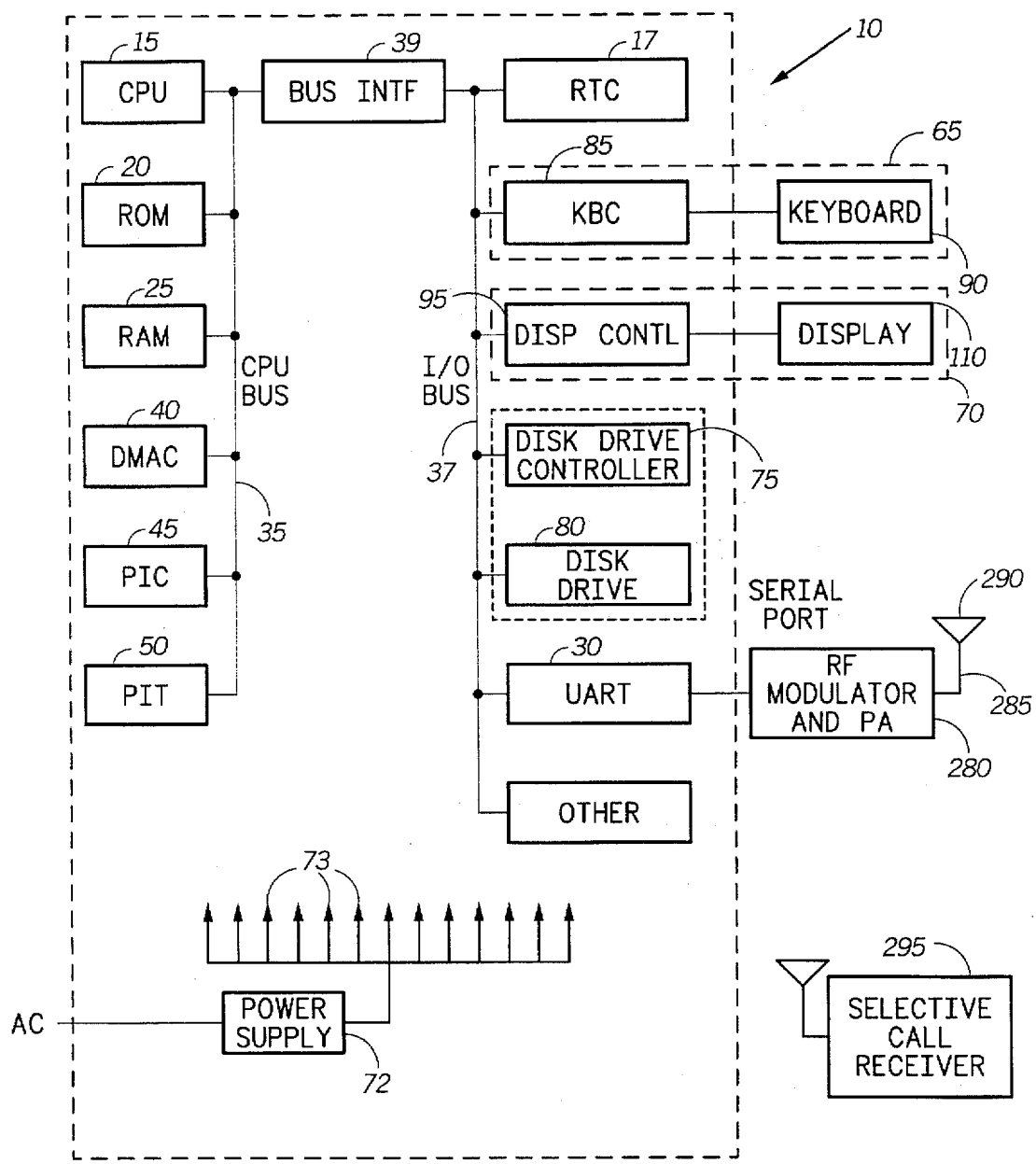
FIG. 1 is a block diagram of a personal computer system suitable for use in connection with one embodiment of the present invention.

A personal computer system 10 suitable for use in accordance with one embodiment of the present invention is set forth in FIG. 1. The computer system 10 includes a CPU 15, a ROM 20, a RAM 25, and a UART 30. The CPU 15, ROM 20, and RAM 25 are connected over a CPU bus 35 which interfaces with an I/O bus 37 through an optional bus interface 39. The computer system 10 may also include additional components such as a direct memory access controller (DMAC) 40, a programmable interrupt controller (PIC) 45, a programmable interval time (PIT) 50, and a real time clock (RTC) 55 which are connected to the CPU bus 35 and I/O bus 37 in the illustrated manner. Additionally, the computer system 10 may include a disk drive unit 60, a keyboard interface 65, and a display interface 70, all of which are likewise connected to one another over busses 35 and 39. All of the various components of the system 10 receive power from a power supply unit 72 which may receive AC power for supplying the necessary power to the components along lines 73.

In operation, the CPU 15 executes various types of data processing and control functions, including executing control of the UART 30. The ROM 20 stores software routines that are executed by the CPU 15. The RAM 25 may also store software routines that are downloaded from the disk drive unit 60 and are executable by the CPU 15 to, for example, control the UART 30. The RAM 25 also stores data. Such data may include data messages input from the keyboard interface 65 by a user for output by the UART 30.

The programmable interrupt controller (PIC) 45 functions to prioritize and identify the various system interrupts for the central processing unit 15. Such prioritizing and identification functions are programmed into the PIC 45 under control of the CPU 15. One such interrupt is generated by the UART 30 as will be set forth in further detail below. The DMAC 40 performs control of direct memory accessing, and the RTC 17 is a time piece module which operates by means of its own battery. The disk drive unit 60 may be a hard disk drive unit having a hard disk controller 75 and a hard drive assembly 80 that includes the storage media. The disk drive unit 60 functions to store and allow access to programs and data that are downloaded to the RAM 25 for execution and use by the CPU 15.

The keyboard assembly 65 includes a keyboard controller 85 that provides the interface between a keyboard 90 and the I/O bus 37. The keyboard assembly 65 functions to allow a user to interface with the computer system 10 to perform a wide range of functions, including running programs stored on the disk drive unit 60 and entering data. The display interface 70 operates under the control of the CPU 15 and includes a display controller 95 that typically includes video RAM and a character ROM, and a display 110, such as an LCD or CRT display. In operation, the video RAM of the display controller 95 stores display data to be shown on the display 110. The character ROM of the display controller 95 stores data representing the dot patterns of various character fonts.

The UART 30 may be, for example, an Intel 8250 universal asynchronous receiver/transmitter integrated circuit. Although the present discussion will focus on the 8250 UART, those skilled in the art will also recognize that other UARTs are suitable for use in the illustrated system.

Figure 2:
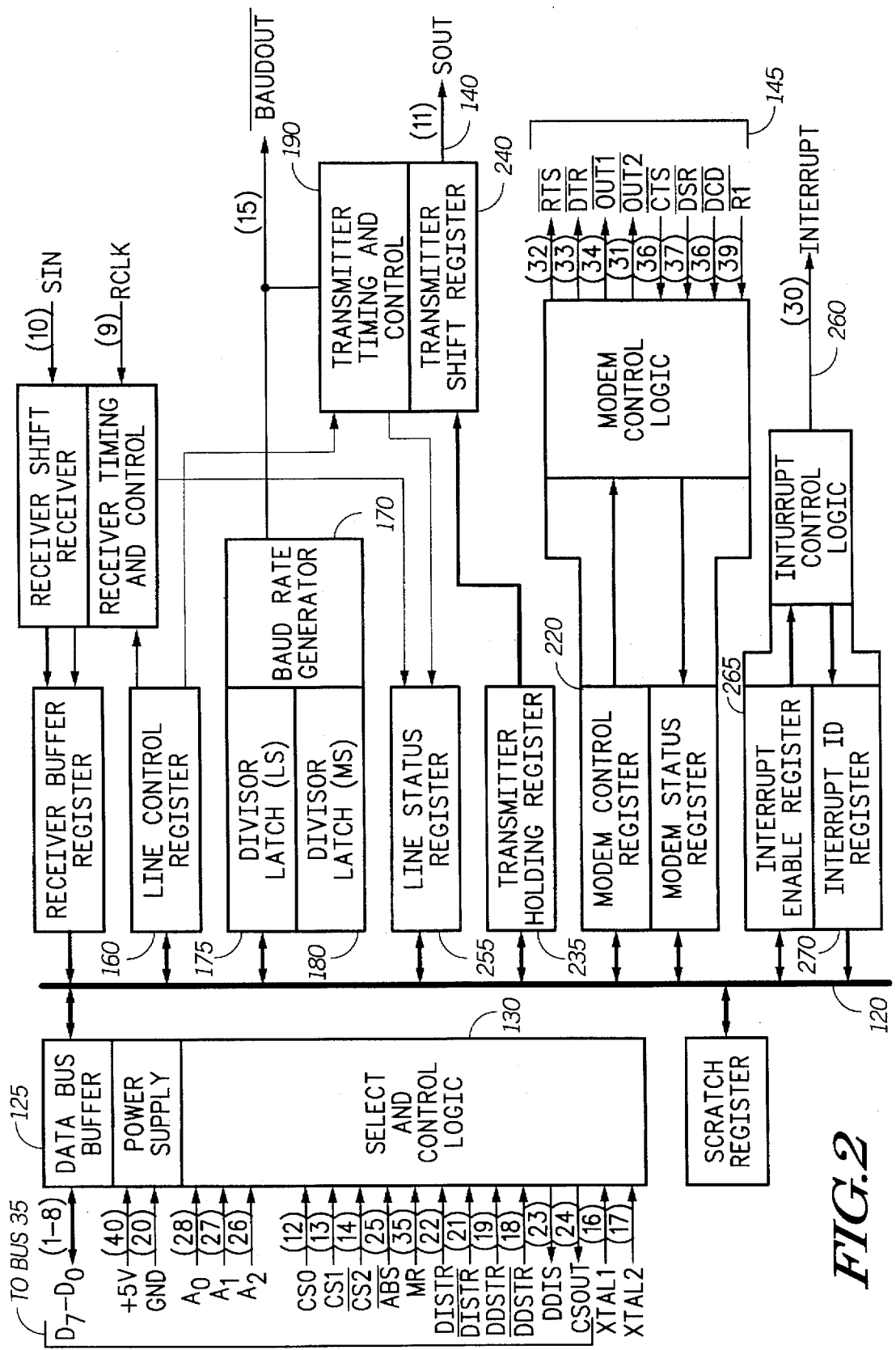
FIG. 2 is a block diagram of one embodiment of a UART used in the personal computer system of FIG. 1.

A block diagram for an 8250 UART integrated circuit is set forth in FIG. 2. As illustrated, the UART 30 includes an internal bus 120 over which the internal data and control signals are transmitted. A data bus buffer 125 provides an interface between the data lines of I/O bus 37 and the data lines of the internal bus 120. The control signals of the internal bus 120 are interfaced to the control signals of the bus 37 by a select and control logic circuit 130.

The UART 30 includes a number of internal registers which are accessible by the CPU 15 to control operation of the UART 30 and to monitor the status of the UART 30 operation. In accordance with one embodiment of the present invention, these registers are used by the CPU 15 under the control of stored executable programs to transmit a synchronous data transmission.

Figure 3:
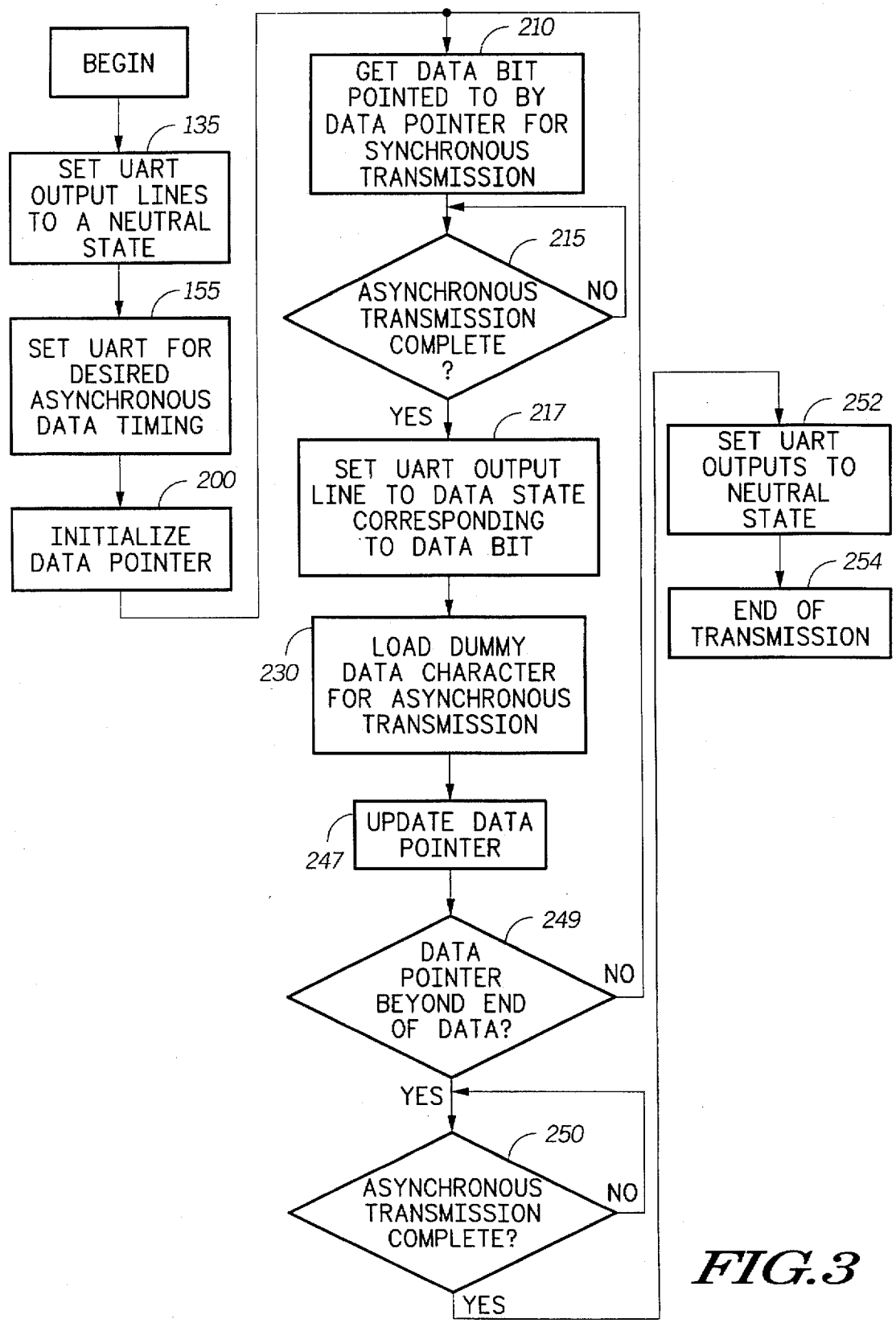
FIG. 3 is a flow diagram illustrating operation of the personal computer system and the UART in accordance with one embodiment of the present invention.

Control and monitoring of these registers may take place in accordance with the flow diagram of FIG. 3. As illustrated, the UART output lines may first be set by the CPU 15 to a neutral state at step 135. These output lines may include the serial output line 140 (SOUT), as well as the modem control lines, collectively shown here at 145. The typical function of the signals on these lines during asynchronous transmission of a data byte is readily understood by those skilled in the art.

The UART 30 is set for the desired asynchronous data timing at step 155 by the CPU 15. The data timing is set so that one complete asynchronous transmission corresponds to the time period for the synchronous transmission of a single bit in the synchronous data transmission (bit cell time). The data timing is set by controlling one or more of the baud rate and format parameters of the asynchronous data transmission.

With reference to FIG. 2, the format of the asynchronously transmitted data character is controlled by the Line Control Register (LCR) 160, the contents of which are controlled by the CPU 15. The contents of the LCR 160 include LCR Bits 0 through 7 of which:

LCR (0)=Word Length Select Bit 0 (WLS0)
LCR (1)=Word Length Select Bit 1 (WLS1)
LCR (2)=Stop Bit Select (STB)
LCR (3)=Parity Enable (PEN)
LCR (4)=Even Parity Select (EPS)
LCR (5)=Stick Parity
LCR (6)=Set Break
LCR (7)=Divisor Latch Access Bit (DLAB)

LCR(0) and LCR(1) determine the word length of the asynchronously transmitted data character. The number of bits in each asynchronously transmitted serial character is programmed by setting the bits to the appropriate data state as follows:

TABLE 1

| LCR(1) | LCR(0) | WORD LENGTH |
| --- | --- | --- |
| 0 | 0 | 5 Bits |
| 0 | 1 | 6 Bits |
| 1 | 0 | 7 Bits |
| 1 | 1 | 8 Bits |

LCR(2) specifies the number of stop bits in each asynchronously transmitted character. If LCR(2) is a logic 0, one stop bit is generated in the transmitted data. If LCR(2) is a logic 1 when a 5 bit word length is selected, 1.5 stop bits are generated. If LCR(2) is a logic 1 when either a 6, 7, or 8 bit word length is selected, two stop bits are generated.

Transmission of a parity bit during asynchronous data transmission is also controlled by the state of the bits of the LCR 160. When LCR(3) is high, a parity bit between the last data word bit and stop bit is generated for transmission during asynchronous transmission of a data character.

The baud rate of the asynchronous transmission is controlled by a Baud Rate Generator 170 that is responsive to the data contained in divisor registers 175 and 180. LCR(7) of the LCR 160 is the divisor latch access bit (DLAB) and must be set high (logic 1) to access the divisor latches 175 and 180 of the Baud Rate Generator 170 during a read or write operation. When the DLAB is set high, the CPU 15 may write to the divisor registers to set the desired baud rate for the asynchronous transmission. LCR(7) is set to a low data state to access the other registers of the UART 30.

The Baud Rate Generator 170 generates the clock signal for the UART 30 function, providing standard ANSI/CCITT bit rates. The oscillator driving the Baud Rate Generator 170 may be provided either with the addition of an external crystal to the XTAL1 and XTAL2 inputs, or an external clock into XTAL1. In either case, a clock output is provided for use by a transmitter timing and control circuit 190.

Referring again to FIG. 3, after the UART 30 has been programmed for the desired asynchronous data timing corresponding to the bit cell timing of the synchronous transmission, a data pointer is initialized at step 200 by the CPU 15. The data pointer identifies the location in system memory at which the data that is to be synchronously transmitted is stored. The data may be, for example, downloaded from disk drive 60 or entered by the user from the keyboard 90. After pointer initialization, the CPU 15 executes a program loop. During this program loop, the data bit pointed to by the data pointer is retrieved by the CPU at step 210. A check is then made by the CPU at step 215 to determine whether any prior asynchronous transmission is complete. I a prior transmission is not complete, the program loop executed by the CPU will cause the CPU to wait until the transmission is complete before executing further steps of the loop.

At step 217, the CPU 15 commands an output line of the UART 30 to a data state corresponding to the data state of the bit that is to be transmitted as part of the synchronous data transmission. The output line can be selected from any of the UART 30 output lines that are subject to control by the CPU 15. Such output lines include the serial output line 140 (SOUT), as well as the modem control lines 145 (FIG. 2). Each of these lines can be commanded to a data state that is independent of the data state of the bits of any asynchronous data transmitted by the UART 30. The output line that is selected becomes the synchronous data output line.

The Modem Control Register (MCR) 220 can be used by the CPU 15 to control the state of one or more of the lines 145. The MCR 220 controls the state of the lines as described below in TABLE 2. The outputs are directly controlled by their respective control bits in this register.

TABLE 2

| | MCR BIT LOGIC 1 | MCR BIT LOGIC 0 |
| --- | --- | --- |
| MCR (0) Data Terminal Ready | $\overline{\text{DTR}}$ output Low | $\overline{\text{DTR}}$ Output High |

TABLE 2-continued

| | MCR BIT LOGIC 1 | MCR BIT LOGIC 0 |
|---|---|---|
| (DTR) | | |
| MCR (1) Request to Send (RTS) | $\overline{\text{RTS}}$ Output Low | $\overline{\text{RTS}}$ Output High |
| MCR (2) OUT1 | $\overline{\text{OUT1}}$ Output Low | $\overline{\text{OUT1}}$ Output High |
| MCR (3) OUT2 | $\overline{\text{OUT2}}$ Output Low | $\overline{\text{OUT2}}$ Output High |
| MCR (4) LOOP | LOOP Enabled | LOOP Disabled |
| MCR (5), (6), and (7) 0 | X | X |

The SOUT line 140, which is generally used to transmit the asynchronous data from the UART 30, is also usable for the transmission of the synchronous data since the state of the SOUT 140 line may be controlled independent of the state of the bits which are to be asynchronously transmitted by the UART 30. More particularly, the state of the SOUT line 140 may be controlled so that it is dependent on the state of the seventh bit of LCR 160. When LCR(6) is set to logic (1), the SOUT line 140 is forced to the spacing (logic 0) state. The break is disabled by setting LCR(6) to a logic-0. The Control of the LCR(6) bit acts only on SOUT and has no effect on any other transmitter logic. Additionally, a loop back command may be issued by the CPU 15 by setting MCR(4) to a logic (1) which, in turn, forces SOUT line 140 to a logic (1) state.

With reference to FIG. 3, the synchronous data output line, selected from lines 140 and 145, goes to the data state set in step 217 for only a predetermined period of time. This period of time has been previously set and corresponds to the length of time that is required for transmission of an asynchronous data byte given the parameters set in step 155. Accordingly, the CPU 15 loads a dummy data character into the UART 30 for asynchronous transmission at step 230. This is done, for example, by loading the Transmitter Holding Register 235 of the UART 30 (see FIG. 2) with a dummy data byte. The dummy data from the Transmitter Holding Register 235 is transferred for transmission by a Transmitter Shift Register 240 once the Transmitter Shift Register is empty. It is to be noted that the asynchronous transmission need not appear for actual transmission at the SOUT line 140.

After the dummy data character has been loaded for asynchronous transmission, the CPU 15 updates the data pointer at step 247 and checks to determine whether the pointer points to a memory location beyond the location of the last data bit of the synchronous transmission at step 249. If it is pointing to a location beyond the last data bit, the synchronous message has been completely transmitted, and the system checks for completion of the prior asynchronous transmission at step 250, sets the UART output lines to a neutral state at step 252, and terminates further synchronous data transmission at 254. If there is further data that is to be synchronously transmitted, the CPU 15 continues executing the program loop by returning to step 210. This cycle is repeated until all data bits of the synchronous transmission have been transmitted.

A complete asynchronous transmission at steps 215 and 250 can be monitored in one of several different manners. In accordance with one manner, the UART 30 is provided with a Line Status Register 255 (LSR) having one or more data bits that are polled by the CPU 15. These data bits operate to go to a predetermined data state upon complete transmission of the dummy data character. The contents of the LSR 255 are set forth in TABLE 3.

TABLE 3

| | LOGIC 1 | LOGIC 10 |
|---|---|---|
| LSR (0) Data Ready (DR) | Ready | Not Ready |
| LSR (1) Overrun Error (OE) | Error | No Error |
| LSR (2) Parity Error (PE) | Error | No Error |
| LSR (3) Framing Error (FE) | Error | No Error |
| LSR (4) Break Interrupt (BI) | Break | No Break |
| LSR (5) Transmitter Holding Register Empty (THRE) | Empty | Not Empty |
| LSR (6) Transmitter Empty (TEMT) | Empty | Not Empty |
| LSR (7) Not Used | | |

Of particular note in detecting complete asynchronous transmission of the dummy data byte are the Transmitter Holding Register bit, LSR(5), and the Transmission Shift Register Empty bit, LSR(6). The Transmitter Holding Register Empty bit LSR(5) indicates that the Transmitter Holding Register 235 is empty and ready to receive another character. The LSR(5) bit is set high when a character is transferred from the Transmitter Holding Register to the Transmitter Shift Register 240 and is reset low by the loading of the Transmitter Holding Register 235 by the CPU 15. As noted above, data is transferred from the Transmitter Holding Register 235 to the Transmitter Shift Register 240 only after the Transmitter Shift Register has completed transmission of the dummy data character. The Transmission Shift Register Empty bit, LSR(6), indicates that the Transmitter Shift Register is empty, and the UART 30 has completed transmission of the last character. Either or both the Transmitter Holding Register LSR(5) and Transmitter Shift Register Empty LSR(6) are suitable for determining whether the asynchronous transmission of the dummy data character is complete.

In accordance with another manner of monitoring for complete transmission of the dummy data character, the UART 30 generates an interrupt at line 260 which may be detected either directly by the CPU 15 or indirectly by the CPU 15 through the PIC 45 in a known manner. In the 8250 UART utilized in the present embodiment, the interrupt is enabled by setting a bit in an Interrupt Enable Register 265 of the UART 30 to a predetermined state. Upon detecting the interrupt, the CPU 15 may determine the cause of the interrupt by reading the LSR 255 or by reading an interrupt Identification Register 270. The CPU 15 clears the interrupt after determining its cause.

As illustrated in FIG. 2, the synchronous output line from UART 30 may be supplied to a radio frequency modulator/power amplifier 280. The radio frequency modulator/power amplifier 280 modulates the synchronously transmitted data on line 285 to a radio frequency and amplifies the modulated signal for transmission by an antenna 290. The modulated synchronous data transmission may then be received by, for example, a selective call receiver 295 such as one known in the art.

Figure 4:
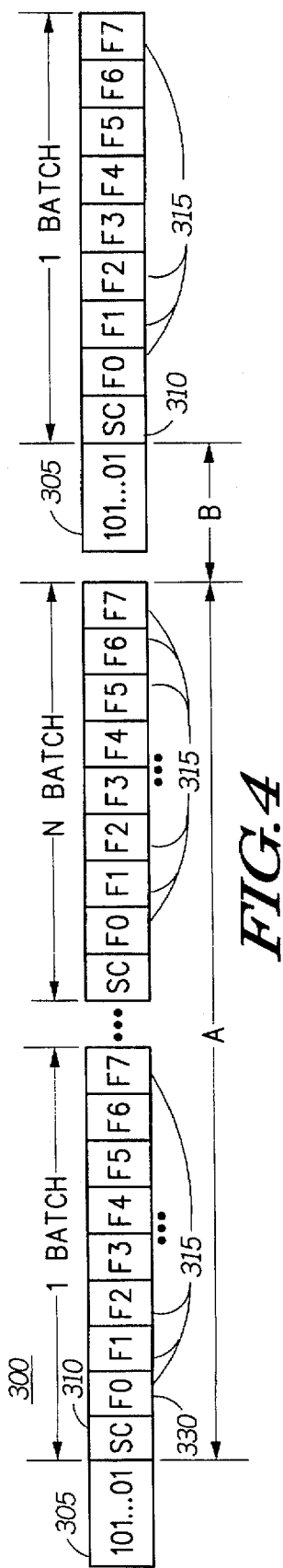
FIGS. 4–6 are diagrams that illustrate the POCSAG protocol used in accordance with one embodiment of the invention.

The system illustrated by FIGS. 1–3 can be used to transmit synchronous transmissions in accordance with the POCSAG protocol. Signal diagrams illustrating the POCSAG protocol are set forth in FIGS. 4–6. The POCSAG signaling protocol 300 comprises a series of addresses and/or message information bits identified as batches which are intended for individual selective call receivers or groups of selective call receivers assigned to a paging system. The series of addresses is assembled in accordance with requests and transmitted as a continuous transmission. The transmission is of a digital format and starts with a preamble 305 of at least 576 bits of alternating "ones" and "zeros," equivalent to the duration of a batch and one additional codeword. The preamble 305 is followed by one or more batches of addresses and message codewords. Each batch begins with a synchronization codeword (SC) 310 followed by eight frames (F0–F7) 106. The paging transmitter 280, during its transmissions, transmits a plurality of batches (1-to-N) for a period of A seconds, the number of batches being dependent upon the amount of address/message information to be transmitted. After the first transmission of the N-batches of address/information in A units of time, a new transmission begins at some time (B) after the end of the first transmission, depending on message inputs. The second transmission similarly begins with a preamble 305, and at least one batch, each batch beginning with a synchronization codeword 310.

Figure 5:
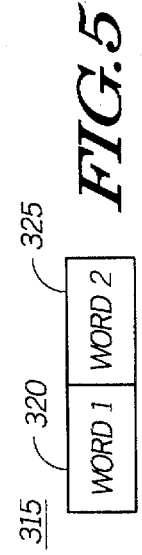

FIG. 5 shows a timing diagram of frames 315, each frame 315 of the batches (1-to-N) having a duration equivalent to two codewords (WORD1, WORD2) 320, 325, namely address codewords and/or message codewords.

Figure 6:
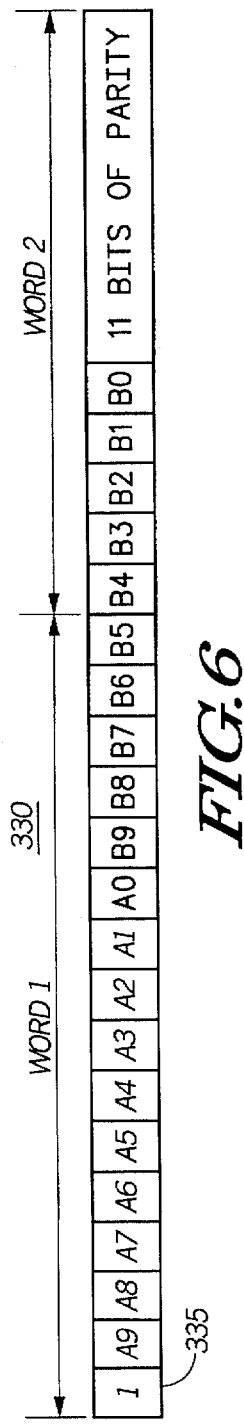

FIG. 6 shows a more detailed timing diagram of the first frame (F0) 330 of the first batch of each transmission. Specifically, the first frame 330 similarly comprises two codewords 320, 325. Each codeword comprises 32 bits. The first bit 335 of frame 330 is encoded with either a binary "one" or "zero." The binary "one" indicates that the following data is message data, and the binary "zero" indicates that the following data is address data. After transmitting preamble 305 and the first synchronization codeword 310, the paging transmitter transmits, in the first frame (F0) 330, variable system information. The variable system information uses the binary "one" at the beginning of the first frame 330 to indicate that the following data is the variable system information. The variable system information contains, in units of batch times rounded to the lowest integer, the number of batches in the current transmission A9–A0 and the amount of time from the end of the current transmission to the first bit of the first synchronization codeword 310 of the next transmission B9–B0. Accordingly, the selective call receiver can calculate the time from the end of one transmission to the beginning of another transmission from the data received in the variable system information. Upon decoding the variable system information, the selective call receivers know precisely the time to the first bit of the first synchronization codeword of the next transmission.

The present invention has been described in connection with one embodiment utilizing a standard personal computer having an 8250 UART. Other processing units controlling other UART types are likewise applicable for use in accordance with the teachings of the present invention. Similarly, the embodiment disclosed herein has been described in connection with a synchronous data transmission conforming to the POCSAG protocol. Other synchronous data protocols my also be utilized. Accordingly, although the present invention has been described with reference to a specific embodiment, those of skill in the art will recognize that changes may be made thereto without departing from the scope and spirit of the invention as set forth in the appended claims.

What is claimed is:

1. An asynchronous system for transmitting a synchronous stream of data comprising:

a universal asynchronous transmitter/receiver having means for accepting data including framing bits intended for asynchronous transmission, timing means for generating a signal upon completion of the asynchronous transmission of the data character, an output line controllable to go to a data state independent of the data states of the bits of the data character; and central processing means, responsive to the timing means, for controlling the output line of the universal asynchronous transmitter/receiver to go to a series of data states corresponding to individual bits of the synchronous data stream, each individual bit having a period corresponding to the signal generated by the timing means and wherein said central processing means eliminates the framing bits from the asynchronous stream of data to accomplish synchronous data transmission.

2. The system of claim 1 wherein the central processing means comprises:

a central processing unit;

memory means for storing executable code for execution by the central processing means; and input means for inputting data into the memory means and eliminating the framing bits from the data received asynchronously for subsequent synchronous transmission.

3. The system of claim 1 wherein the input means is a keyboard.

4. The system of claim 1 wherein the memory means comprises a random access memory.

5. The system of claim 1 wherein the memory means comprises a disk drive storage device.

6. The system of claim 1 and further comprising means for modulating the signal at the output line of the universal asynchronous receiver/transmitter for radio frequency transmission of the synchronous stream of data.

7. The device of claim 6 wherein the synchronous stream of data conforms to the Post Office Code Standardization Advisory Group protocol.

8. An asynchronous device for generating a synchronous data transmission comprising: a universal asynchronous receiver/transmitter including means for generating a transmission complete signal representing a complete asynchronous transmission of data including framing bits; first means for setting the universal asynchronous receiver/transmitter for asynchronous transmission of a data character length and data character baud rate corresponding to synchronous bit cell timing of the synchronous data transmission; second means for setting an output line of the universal asynchronous receiver/transmitter to a data state corresponding to a data bit to be synchronously transmitted wherein the framing bits are eliminated from the data to be synchronously transmitted; third means for asynchronously transmitting a data character; fourth means for detecting occurrence of the transmission complete signal; and fifth means for setting the output line of the universal asynchronous receiver/ transmitter to a data state corresponding to a next data bit to be transmitted upon detection of the transmission complete signal wherein said fifth means eliminates the flaming bits asynchronous transmission of data to accomplish synchronous data transmission.

9. The device of claim 8 and further comprising sixth means for continuing operation of the third, fourth, and fifth means until all data bits of the synchronous transmission are transmitted.

10. The device of claim 8 wherein the third means transmits a dummy data character.

11. The device of claim 8 wherein the transmission complete signal comprises one or more bits of an internal register of the universal asynchronous transmitter/receiver.

12. The device of claim 8 wherein the transmission complete signal is an interrupt signal generated by the universal asynchronous transmitter/receiver.

13. The device of claim 8 and further comprising means for modulating the signal at the output line of the universal asynchronous receiver/transmitter for radio frequency transmission of the synchronous data transmission.

14. The device of claim 13 wherein the synchronous data transmission conforms to the Post Office Code Standardization Advisory Group protocol.

15. An asynchronous system for transmitting a synchronous stream of data comprising: a central processing unit; a memory for storing code for execution by the central processing unit and for storing the data states of the synchronous stream of data; a universal asynchronous transmitter/receiver processing unit in response to the code executed by the central processing unit, the universal asynchronous transmitter/receiver including an output line responsive to commands received from the central processing unit to go to either a first or second data state, and asynchronous transmitter shift register for transmitting asynchronous data including framing bits, a transmitter holding register for storing data bits received from the central processing unit and for transmitting the data bits to the asynchronous transmitter shift register when the asynchronous transmitter shift register is empty data rate control means, responsive to commands received from the central processing unit, for setting one or more transmission parameters for the asynchronous data, the transmission parameters being selected from the group consisting of baud rate, data character length, and number of stop bits, transmitter empty means for generating one or more signals representative of either an empty transmitter holding register or an empty asynchronous transmitter shift register, the one or more signals being detectable by the central processing unit; means for setting the data rate control; means so that each asynchronous character transmitted by the universal asynchronous transmitter/receiver corresponds to a period for transmitting a single data bit of the stream of synchronous data; means for storing a data character in the transmitter holding register for each data bit of the stream of synchronous data wherein the framing bits are eliminated from the stream of synchronous data; means for commanding the output line of the universal asynchronous receiver/transmitter to go to a series of first and second data states, the first and second data states corresponding to individual bits of the synchronous data stream, the duration of each data state at the output line being determined by the detection of the one or more signals generated by the transmitter empty means wherein said means for commanding eliminates the framing bits from asynchronous stream of data to accomplish synchronous data transmission.

16. The system of claim 15 and further comprising input means for inputting data into the memory means for subsequent synchronous transmission.

17. The system of claim 16 wherein the input means is a keyboard.

18. The system of claim 15 wherein the memory means comprises a random access memory.

19. The system of claim 15 wherein the memory means comprises a disk drive storage device.

20. The system of claim 15 and further comprising means for modulating the signal at the output line of the universal asynchronous receiver/transmitter for radio frequency transmission of the synchronous stream of data.

21. The system of claim 20 wherein the synchronous stream of data conforms to the Post Office Code Standardization Advisory Group protocol.

22. A method for transmitting a synchronous stream of data using an asynchronous transmitter/receiver having a means for accepting data for asynchronous transmission including framing N, a timing means for generating a signal upon completion of the asynchronous transmission of the data character, and an output line controllable to go to a data state independent of the data states of the bits of the asynchronous data character, the method comprising the steps of: setting the universal asynchronous transmitter/receiver to transmit a plurality of data character; controlling the output line of the universal asynchronous transmitter/receiver in response to the timing means to go to a series of data states corresponding to individual bits of the synchronous data stream wherein the framing bits are eliminated from the synchronous data stream, each individual bit having a period corresponding to the signal generated by the timing means wherein said means step of controlling eliminates the flaming bits from asynchronous data to accomplish synchronous data transmission.

23. The method of claim 22 and further comprising the step of modulating the signal at the output line of the universal asynchronous receiver/transmitter for radio frequency transmission of the synchronous stream of data.

24. The method of claim 23 and further comprising the step of conforming the synchronous stream to the Post Office Code Standardization Advisory Group protocol.

25. In a computing device having a universal asynchronous receiver/transmitter for transmitting and receiving data asynchronously including framing bits, the asynchronous receiver/transmitter generating a transmission complete signal representing complete asynchronous transmission of a single data character, a method for generating a synchronous data transmission comprising the steps of: setting the universal asynchronous transmitter/receiver for asynchronous transmission of a data character length and data character baud rate corresponding to synchronous bit cell timing of the synchronous data transmission wherein the flaming bits are eliminated from the synchronous data; setting an output line of the universal asynchronous transmitter/receiver to a data state corresponding to a data bit to be synchronously transmitted; asynchronously transmitting a single data character; detecting the occurrence of the transmission complete signal; and setting the output line of the universal asynchronous transmitter/receiver to a data state corresponding to a next data bit to be transmitted upon detecting the transmission complete signal and wherein said step of setting eliminates the flaming bits from asynchronous stream of data to accomplish synchronous data transmission.

26. The method of claim 25 and further comprising the step of continuing to execute the asynchronously transmitting step, the detecting step, and the setting the output line step until all data bits of the synchronous transmission are transmitted.

27. The method of claim 25 wherein the step of asynchronously transmitting the data character includes the step of asynchronously transmitting a dummy data character.

28. The method of claim 25 wherein the universal asynchronous receiver/transmitter includes an internal register for storing one or more bits representing the transmission complete signal and wherein the step of detecting the occurrence of the transmission complete signal comprises the step of periodically polling the one or more bits of the internal register of the universal asynchronous transmitter/receiver to detect completion of asynchronous transmission of the data character.

29. The method of claim 25 wherein the transmission complete signal is an interrupt signal generated by the universal asynchronous transmitter/receiver.

30. The method of claim 25 and further comprising the step of modulating the signal at the output line of the universal asynchronous receiver/transmitter for radio frequency transmission of the synchronous data transmission.

31. The method of claim 30 wherein the synchronous data transmission conforms to the Post Office Code Standardization Advisory Group protocol.

* * * * *

UNITED STATES PATENT AND TRADEMARK OFFICE
CERTIFICATE OF CORRECTION

PATENT NO : 5,742,502
DATED : April 21, 1998
INVENTOR(S): King

It is certified that error appears in the above-identified patent and that said Letters Patent are hereby corrected as shown below:

```
Please amend the claims as follows:

Column 9, line 30, after "empty" insert --,--.

Column 10, line 9, change "N" to --bits--.

Column 10, line 23, change "flaming" to --framing--.

Column 10, line 42, change "flaming" to --framing--.

Column 10, line 52, change "flaming" to --framing--.
```

Signed and Sealed this

Fifteenth Day of May, 2001

Attest:

NICHOLAS P. GODICI

Attesting Officer

Acting Director of the United States Patent and Trademark Office